(12) United States Patent
Swift et al.

(10) Patent No.: US 7,673,174 B2
(45) Date of Patent: Mar. 2, 2010

(54) RECOVERING DEVICE DRIVERS

(75) Inventors: Michael Swift, Madison, WI (US);
Brian Bershad, Seattle, WA (US); Hank Levy, Seattle, WA (US)

(73) Assignee: University of Washington, Seattle, WA (US)

( * ) Notice: Subject to any disclaimer, the term of this patent is extended or adjusted under 35 U.S.C. 154(b) by 458 days.

(21) Appl. No.: 11/398,799

(22) Filed: Apr. 6, 2006

(65) Prior Publication Data

US 2006/0242402 A1    Oct. 26, 2006

Related U.S. Application Data

(60) Provisional application No. 60/669,159, filed on Apr. 6, 2005.

(51) Int. Cl.
*G06F 11/00* (2006.01)

(52) U.S. Cl. .............................. 714/15; 714/2; 719/321

(58) Field of Classification Search .................. 719/321; 714/15

See application file for complete search history.

(56) References Cited

U.S. PATENT DOCUMENTS

| | | | | |
|---|---|---|---|---|
| 5,307,491 | A * | 4/1994 | Feriozi et al. ................ | 719/326 |
| 5,339,426 | A * | 8/1994 | Aoshima ....................... | 713/1 |
| 6,658,489 | B1 * | 12/2003 | Asselin ......................... | 719/327 |
| 7,017,075 | B1 * | 3/2006 | Peters .......................... | 714/15 |
| 2006/0020854 | A1 * | 1/2006 | Cardona et al. ............... | 714/13 |
| 2006/0070089 | A1 * | 3/2006 | Shoaib et al. ................ | 719/321 |
| 2007/0283432 | A1 * | 12/2007 | Peretti .......................... | 726/21 |

OTHER PUBLICATIONS

Swift et al. Nooks: An Architecture for Reliable Device Drivers. 2002.*
Swift et al. Recovering Device Drivers. Nov. 2006.*
Levy et al. Reducing Downtimes by Replugging Device Drivers. Jun.-Aug. 2004.*

* cited by examiner

*Primary Examiner*—Yolanda L Wilson
(74) *Attorney, Agent, or Firm*—Ronald M. Anderson (57) ABSTRACT

A solution to the problem of maintaining application integrity when device drivers fail. This solution employs a new mechanism, the shadow driver, which is an operating system (OS) kernel agent that monitors communication between the OS kernel and the device driver it "shadows." When a device driver error occurs, the shadow driver acts in place of the failed device driver, intercepting and responding to calls from the OS kernel and the device driver during cleanup, unloading, reloading, and re-initialization of the failed device driver. Applications and the OS kernel are thus isolated from the failure. An initial embodiment was developed for use with the Linux™ OS and was tested with a dozen device drivers. Results demonstrate that shadow drivers successfully mask device driver failures from applications, impose minimal performance overhead, require no changes to existing applications and device drivers, and can be implemented with relatively little code.

27 Claims, 6 Drawing Sheets

RECOVERING DEVICE DRIVERS

RELATED APPLICATIONS

This application is based on a prior copending provisional application, Ser. No. 60/669,159, filed on Apr. 6, 2005, the benefit of the filing date of which is hereby claimed under 35 U.S.C. §119(e).

GOVERNMENT RIGHTS

This invention was made with U.S. Government support under grant Nos. CCR-0326546 and ITR-00085670 awarded by the National Science Foundation. The U.S. Government has certain rights in the invention.

BACKGROUND

It is generally accepted that device drivers cause the majority of failures in commodity operating systems (OSs). Earlier work has shown that an OS kernel reliability system can prevent driver errors from crashing the Linux™ OS kernel, thus maintaining OS integrity. Thus far, however, reliability subsystems have been unable to maintain the integrity of applications using a failed device driver. The failure and recovery of a device driver typically terminates all applications using that device driver, since applications are rarely written to handle device driver errors.

The importance of recovery has long been known in the database community, where transactions prevent data corruption and allow applications to manage failure. More recently, failure recovery has become an important issue for OSs and applications.

The most general approach to recovery is to run application replicas on two machines, a primary and a backup. All inputs to the primary are mirrored to the backup. After a failure of the primary, the backup machine takes over to provide service. The replication can be performed within the hardware, at the hardware-software interface, at the system call interface, or at a message passing or application interface. However, this approach adds considerable cost and complexity.

Another common recovery approach is to restart applications after a failure. Many systems periodically save the application state as checkpoints, while others combine checkpoints with logs. These systems transparently restart failed applications from their last checkpoint (possibly on another machine) and replay the log if one is present. However, recent work has shown that this approach is limited when recovering from application faults, since applications often become corrupted before they fail, and thus, their logs or checkpoints may also be corrupted. Yet another approach is simply to reboot the failed component.

A system that was previously developed to handle device driver and extension faults called "Nooks™" takes this latter approach and unloads and reloads failed OS kernel extensions, such as device drivers. Rebooting has been proposed as a general strategy for building high-availability software, but forces applications to handle the failure, for example, by taking over the task of re-initializing state that has been lost by the rebooted component. However, few existing applications are able to reboot without losing state. Accordingly, this approach is not practical for improving the reliability of existing applications. Clearly, a solution is needed that addresses the problems of device driver failures by transparently restoring device driver state lost in the reboot, invisibly to applications, so that the failure of the device driver minimally impacts the OS and any applications using the device driver.

The solution should also facilitate device driver isolation in order to prevent failed device drivers from corrupting the OS or applications. Such isolation can be provided in various ways. It has been proposed to encapsulate extensions using software fault isolation, and to use transactions to repair OS kernel state after a fault. Nooks™ and other approaches isolate extensions in protection domains enforced by virtual memory hardware. MicroOS kernels and their derivatives force isolation by executing extensions in user mode. Rather than concealing failures, though, all of these systems take a revealing strategy, in which the application or user is made aware of the failure. The OS typically returns an error code, telling the application that a system call failed, but little else (e.g., it does not indicate which component failed or how the failure occurred). The burden of recovery then rests on the application, which must decide what steps to take to continue executing. Most applications are not prepared to handle the failure of device drivers, since device driver faults typically cause a system crash on commodity OSs.

Mechanisms have been proposed that transparently improve the reliability of existing software through interposition. Other systems approach the same goal by verifying the correctness of system calls, restarting applications after a failure, retrying failed system and library calls, restarting OS kernel extensions after a failure, or reconnecting applications to databases after a failure. Accordingly, it would be desirable to use procedure call interposition to mirror and redirect OS kernel-device driver communications.

Several systems have narrowed the scope of recovery to focus on a specific subsystem or component. For example, the Rio file cache achieves high performance by isolating a single system component, the file cache, from OS kernel failures. Another technique provides transparent recovery after the failure of a single component type, replicated databases in multi-tier applications. Thus, it appears that a solution to the problem of system stability should focus on recovery for a single OS component type, the device driver, which is the leading cause of OS failure. By abandoning general-purpose recovery, a major cause of application and OS failure can be resolved, while simplifying implementation and reducing runtime overhead. In a more general sense, the solution that is developed for handling device driver failures should be applicable for similarly handling failure of other types of software modules, so that the OS and applications using the modules are minimally (or not at all) affected by the failure of a module.

SUMMARY

The following discussion presents a solution to the problem of maintaining application integrity when device drivers fail. This approach, although initially targeted at handling failed device drivers, is also useful in handling the failures of other types of software modules. While the following discussion is primarily directed to the application of this approach to device driver failures, it will be understood, that the term "device driver" as used in this description can in most cases simply be replaced by the more general term "module" to understand how the approach is useful for handling the failures of other types of modules.

A new mechanism is employed for the present novel approach, called the shadow driver. The shadow driver is an OS kernel agent that monitors communication between the OS kernel and the device driver it "shadows." When a device driver error occurs, the shadow driver acts in place of the failed device driver, intercepting and responding to calls from the OS kernel and the device driver during cleanup, unloading, reloading, and re-initialization of the failed device driver—but not functioning as an alternative or replacement for the failed device driver. By impersonating device drivers during recovery (although without providing the functionality of the device driver), shadow drivers conceal errors caused by device driver failures, thereby protecting the OS kernel and applications that may use the device driver to interface with a hardware device. Such applications and the OS kernel are thus isolated from the failure of the device driver.

In some ways, like device driver replication schemes, shadow drivers mirror all communications between the OS kernel and device driver (the primary), sending copies to the shadow driver (the backup). If the device driver fails, the shadow driver takes over temporarily until the device driver recovers. However, shadow drivers differ from typical replication schemes in several ways. First, because the goal is to tolerate only device driver failures, not hardware failures, both the shadow driver and the "real" device driver run on the same machine. Second, and more importantly, the shadow driver is not a replica of the device driver. Instead, it implements only the services needed to manage the recovery of the failed device driver and to shield applications from the recovery. For this reason, the shadow driver is typically much simpler than the device driver it shadows.

In the broader sense, a shadow driver can be viewed as a recovery agent for an extensible system that includes an environment and a set of components. The environment defines a set of interfaces that the environment uses to invoke or call components. A shadow driver performs two tasks in such a system: (1) it conceals the failure of a component from the environment; and, (2) it restores the component to a functioning state after failure.

An exemplary shadow driver implementation discussed below is based solely on the interface to components and not to the implementation of those components. To conceal failures, a shadow driver answers requests on behalf of the component. For this approach to work properly, a possible response to all requests into a component must be one of the following: (1) replay the response to a similar previous request; (2) respond that the component is currently busy; (3) block the caller until recovery completes; (4) queue the request to be processed later, which implies that the request is guaranteed to succeed or that the failure of the request can be ignored by the environment; or (5) ignore the request, which implies that either the request is idempotent and was previously queued, or that the request has no significant side-effects on the component. Furthermore, to conceal failures, it must be possible to either drop or replay requests to the component without impacting correctness. Otherwise, the environment must be notified of requests that were in progress at the time of failure, since they may be completed before the failure was detected.

To recover after a failure, the shadow driver preferably replays a subset of the requests/responses from the environment into the component. For this approach to be effective, several properties must hold. First, the "useful" state of the component, meaning the state that impacts how the component processes requests, must be determined by communication with the environment and not with other agents (e.g., the outside world in the case of drivers). Second, the state of a driver must be determined by a small subset of the inputs to a component and not by all inputs. For example, in the case of device drivers, only configuration requests and connection operations must be replayed.

Another extensible systems where these properties hold are media players with plug-in decoders. The state of these decoders is based on the past few packets, and the configuration state at the beginning of a media stream. It is possible to drop a few samples or frames without significant impact on application correctness. Thus, it will be apparent that the concept of a shadow driver is applicable to a variety of different types of extensible systems and is not limited to an operating system environment.

One exemplary aspect of this approach is directed to a method for recovering from a failure of a component executing on a computing device. The method includes the step of monitoring communications between the component and an extensible system on the computing device. Data for the component that were derived from the communications are stored and are indicative of a state of device driver before it failed. Any failure of the component is detected, and in response, interaction of the component with the extensible system is temporarily interrupted. The component is then re-initialized using the data that were stored, so that the component is restored to its prior state and full functionality. The component is enabled to again interact with the extensible system.

Another aspect of the present approach is directed to a system that is able to recover from a failure of a device driver. The system includes a memory in which machine instructions are stored. The machine instructions are used to implement an operating system kernel, a device driver, and a shadow driver. Also included in the system is a processor coupled in communication with the memory. The processor runs the operating system kernel, the device driver, and the shadow driver, by executing the machine instructions provided for each and employs the shadow driver for monitoring communications between the device driver and the operating system kernel, to determine a state of the device driver. The state of the device driver is stored in the memory. The shadow driver also determines when a failure of the device driver has occurred, and in response to detecting such a failure, temporarily interrupts communications between the device driver and the OS kernel and successively unloads the device driver, reloads the device driver, and re-initializes the device driver to the state that was stored in the memory. Communications between the device driver that has been re-initialized and the OS kernel are then restored by the shadow driver, so that the device driver is recovered from the failure.

Shadow drivers were initially implemented in the Linux OS and were tested and measured with a dozen Linux device drivers. The results demonstrate that shadow drivers: (1) successfully mask device driver failures from applications; (2) impose minimal performance overhead; (3) require no changes to existing applications and device drivers; and, (4) can be implemented using relatively little code.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

Three Shadow Drivers: Principles and Architecture

Shadow drivers are OS kernel components that transparently assume the role of device drivers when the device drivers are unavailable, but not the full functionality. The shadow drivers thus hide failures of the device drivers that they are shadowing from the OS and from any applications that are using the device drivers, and facilitate restarting the device drivers to again become functional. The design for shadow drivers in the present invention reflects four principles:

1. Device driver failure should be transparent to the OS and hence, to applications. The notion here is simple—if the OS is unaware that a device driver has failed, it will shield applications from the failure.
2. Recovery logic should be centralized in a single subsystem. Some OS components must be aware of failures in order to trigger and service recovery. However, it is preferable to avoid spreading recovery knowledge through a large number of existing components.
3. Device driver recovery logic should be generic. It would be impractical to expect programmers to write a new recovery module for each of the tens of thousands of existing device drivers. Therefore, a single shadow driver must be able to handle recovery for many device drivers, e.g., for any device driver that is a member of a class of device driver for which the shadow driver is designed to provide its "shadowing" functionality.
4. Recovery services should have low overhead when not needed. The recovery system that employs shadow drivers should impose relatively little overhead for the common case (viz., when device drivers are operating normally).

Overall, the design principles employed in the present approach are intended to minimize the effort required to build and integrate shadow drivers while maximizing their leverage and efficiency in existing commodity OSs.

A shadow driver is a recovery agent for an extensible system. An extensible system includes an environment and a set of components. The environment defines a set of interfaces that it uses to invoke or call components.

A shadow driver performs at least two important tasks, including concealing the failure of a component from the environment, and restoring the component to a functioning state after failure. The exemplary shadow driver implementation discussed below is based solely on the interface to specific components and not to the implementation of those components.

To conceal failures, a shadow driver answers requests on behalf of a component that it is shadowing. For this function to be successful, a possible response to all requests into a component will preferably be one of the following:

replay the response to a similar previous request;

respond that the component is currently busy;

block the caller until recovery of the component is completed;

queue the request so that it can be processed later, which implies that the request is guaranteed to succeed or that the failure of the request can be ignored by the environment; or ignore the request, which implies that either the request is idempotent and was previously queued, or that the request has no significant side-effects on the component.

Furthermore, to conceal failures, it must be possible to either drop or replay requests to the component without adversely impacting continued functionality of the environment. Otherwise, the environment must be notified of requests that were in progress at the time of failure, since they may have been completed before the failure was detected.

To recover after a failure, the shadow driver replays a subset of the requests/responses from the environment into the component. For this approach to be effective, the "useful" state of the component (meaning the state that impacts how the component processes requests) must be determined by communication with the environment and not with other agents (e.g., the outside world in the case of drivers). Also, the state of a driver must be determined by a small subset of the inputs to a component, and not by all inputs. Otherwise, the tracking of state implemented by shadow drivers would function no differently than existing logging techniques. For example, in the case of device drivers, only configuration requests and connection operations must be replayed into the device driver to restore its state before a failure of the device driver occurred.

Another exemplary type of extensible system where the preceding properties are also applicable for implementing shadow drivers is a media player with plug-in decoders. The state of these decoders is based on the past few packets processed, and the configuration state at the beginning of a media stream. For this type of extensible system, it is possible to drop a few samples or frames without significant adverse impact on the perceived application functionality.

Exemplary System Configuration Using Device Drivers

Figure 1:
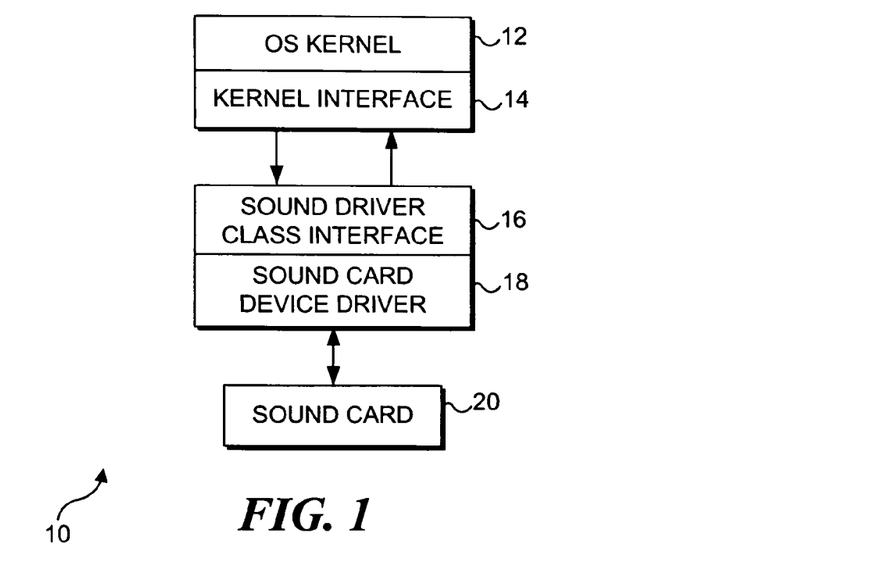
FIG. 1 is a functional block diagram of a device driver for a sound card that exports services defined by the device's class interface and imports services from an OS kernel interface.

A device driver is a specific type of OS kernel-mode software component that provides the interface between the OS and a hardware device. The device driver converts requests from the OS kernel into requests to the hardware. The OS kernel calls into a network device driver to send a packet; in response, the device driver converts the request into a sequence of I/O instructions that direct the device to send the packet. FIG. 1 shows a block diagram 10 illustrating the standard structure of an exemplary device driver. As the Figure shows for this example, a device driver relies on two interfaces—a class interface 16 that the device driver exports to an OS kernel 12, and an OS kernel interface 14 that the device driver imports from the OS. For the example illustrated, a sound card device driver 18 is shown, for use with a sound card 20. Specifically, the sound card device driver serves as an interface between sound card 20 and the OS.

It is assumed that device driver failures are transient, i.e., most of the time, a device driver operates without failure, but occasionally, a device driver fails. For chronically failing device drivers, it is not clear that any automatic recovery mechanism would be sufficient to address the chronic failures. It is further assumed that device drivers are fail-stop, i.e., the device driver stops or is stopped from executing before the effects of the failure can be perceived by other OS kernel modules. As an example, a hard disk device driver that attempts to store beyond the end of a memory buffer must be stopped at the offending write to avoid overwriting memory used for other purposes.

There are several techniques for ensuring that device drivers execute in a fail-stop fashion. An embodiment of the present invention relies on the services developed for Nooks™, an earlier OS kernel reliability subsystem that operates each device driver within its own in-OS kernel protection domain. When a fault occurs in a device driver, Nooks™ stops execution within the device driver's protection domain. To recover, Nooks™ deallocates all of the device driver's OS kernel resources and unloads, reloads, and restarts the failed device driver. However, in the present approach, shadow drivers replace Nooks' recovery process and enable a much more robust technique for handling device driver failure without crashing applications that may use the device driver, or the OS.

In practice, every device driver is a member of a class, which is defined by its interface. For example, all network device drivers obey the same device driver-OS kernel interface for the class of network device drivers, and all sound card device drivers obey the same device driver-OS kernel interface for the class of sound card device drivers. This class orientation simplifies the introduction of new device drivers into the OS, since no OS changes are required to accommodate them.

Shadow Drivers

A shadow driver is a "class device driver," in that it provides transparent recovery for all of the device drivers within a single class of related devices. As a class device driver, the shadow driver is aware of the interface to the device drivers it serves, but not of the details for their implementation. This critical simplifying principle has two key implications. First, implementing a shadow driver does not require a detailed understanding of the internals of each of the device drivers with which it is used. Rather, it requires only an understanding of those device drivers' interactions with the OS kernel. Second, if a new device driver is loaded into the OS kernel, no new shadow driver is required so long as a shadow driver for that class already is installed on the system. Thus, a shadow driver designed for use with a specific class of device drivers should be usable with any device driver in that class. For example, if a new network interface card and device driver are inserted into a PC, the existing network shadow driver for an earlier-used network card can provide "shadow driver" functionality for the new device driver supporting the new network card, without change. Similarly, device drivers can be patched or updated without requiring changes to the shadow drivers for each corresponding class of device drivers. Shadow driver updating is required only to respond to a change in the device driver-OS kernel programming interface, i.e., to respond to a change that affects the entire class of device drivers supported by a specific shadow driver.

A shadow driver executes in two modes, including a passive mode and an active mode. The passive mode, used during normal (non-faulting) operation of the device driver, eavesdrops on all communication between the OS kernel and the device driver for which it provides shadow driver functionality. This communication monitoring is achieved via replicated procedure calls, which are described below. An OS kernel call to a device driver function causes an automatic, identical call to a corresponding shadow driver function. Similarly, a device driver call to an OS kernel function causes an automatic, identical call to a corresponding shadow driver function. These passive-mode calls are invisible to the device driver and to the OS kernel. They are not intended to provide any service to either entity and exist only to permit state tracking by the shadow driver.

The shadow driver is switched to its active mode to facilitate recovery of a device driver from a failure, thereby performing two functions. First, in the active mode, the shadow driver replaces (but not in regard to the functionality of the failed device driver) and "impersonates" the failed device driver, intercepting and responding to calls from the OS kernel, which lets the OS kernel and higher-level applications continue operating in as normal a fashion as possible. Second, the shadow driver impersonates the OS kernel, intercepting and responding to calls from the restarted device driver. This approach hides recovery details from the device driver, i.e., the device driver is unaware that it is being restarted by a shadow driver after a failure, and from the OS kernel. Once the device driver is restarted, the active-mode shadow driver reintegrates the device driver into the system. For example, it restarts any outstanding requests that may have been queued by the shadow driver during failure and recovery of the device driver. It must be emphasized that the shadow driver does not act as a replacement for the device driver for which it is intended to provide shadow driver functionality. Instead, it is limited to performing only the functions required to restart the device driver that has failed in a manner that hides the failure from the OS kernel and from any applications that may be using the device driver.

Dynamic Call Binding

A shadow driver receives two-way communication between a functioning device driver and the OS kernel and impersonates one component to the other during failure and recovery. To support these functions, a mechanism called a "tap" is employed. Conceptually, a tap is a T-junction that "wires" shadow drivers into the communication channels used between device drivers and the OS kernel. The shadow driver monitors every call directed into and out of the device driver and transparently mirrors or redirects the calls, as appropriate to hide the failure of the device driver.

Figure 2:
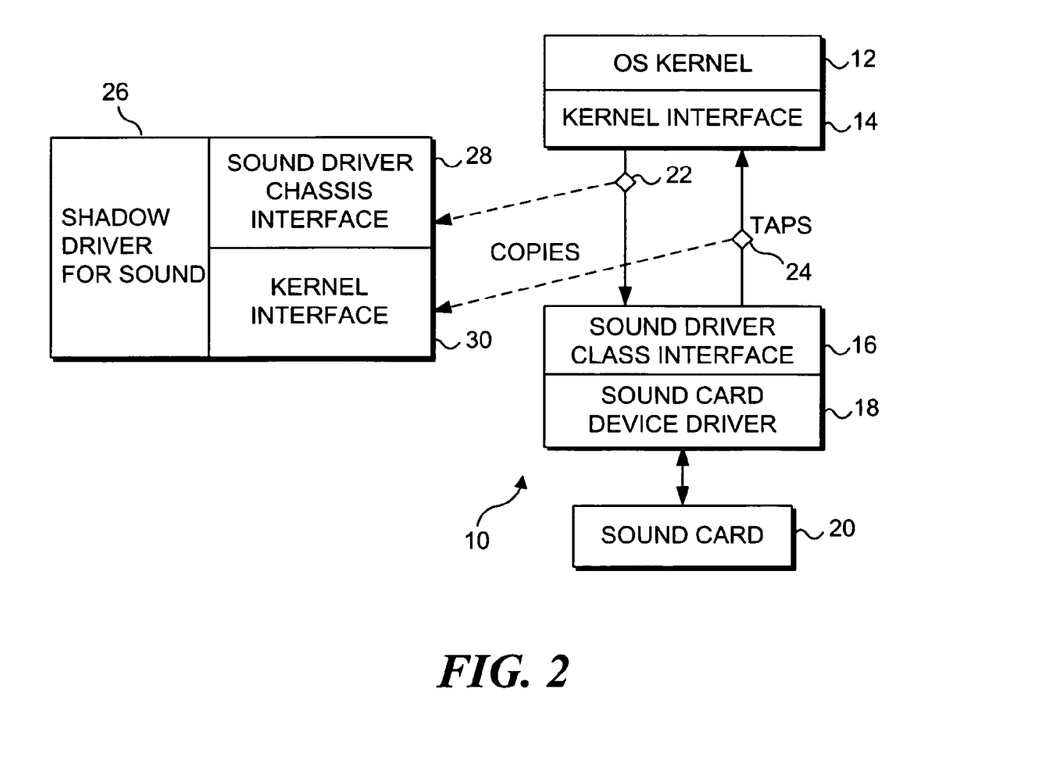
FIG. 2 is a functional block diagram illustrating a shadow driver operating in passive mode, where taps are inserted between the OS kernel and the sound device driver to ensure that all communication between the two is passively monitored by the shadow driver.

A tap operates in one of two modes, corresponding to the state of the shadow driver attached to the tap. During passive-mode operation, the tap: (1) invokes the original device driver; and then, (2) invokes the shadow driver with the parameters and results of the call, i.e., the data indicative of state for the device driver. This operation is shown in FIG. 2, in connection with block diagram 10 for the example of FIG. 1. In FIG. 2, a tap 22 monitors the communication channel from OS kernel interface 14 to sound device driver class interface 16, providing a copy of the communications conveyed thereon to a sound device driver chassis interface 28 of a shadow driver for sound 26. Similarly, a tap 24 monitors the communication channel from sound device driver class interface 16 to OS kernel interface 14, providing a copy of the communications, to an OS kernel interface 30 of the shadow driver for sound.

Figure 3:
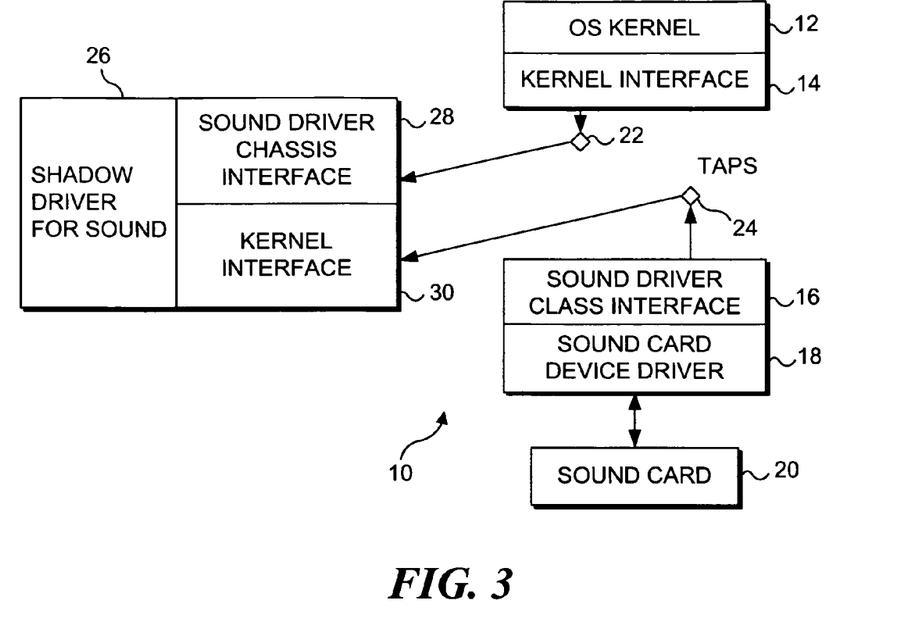
FIG. 3 is a functional block diagram of a shadow driver operating in active mode, indicating that the taps "shut down" communication between the OS kernel and the failed device driver and instead dispatch all necessary communication directly to the shadow driver.

Following a failure of the device driver, these taps switch to active mode, as shown in FIG. 3. In this mode, taps 22 and 24: (1) shut off all normal communication between the device driver and the OS kernel; and, (2) vector all appropriate invocations to their corresponding interfaces 28 and 30 in the shadow driver. In active mode, both the OS kernel and the recovering device driver interact only with the shadow driver, but not directly with each other. Following recovery of the device driver from a failure, the tap is "turned back" to restore communication to passive-mode operation, as shown in FIG. 1.

Most OSs implement communication with procedure calls. Taps depend on the ability to dynamically dispatch procedure calls to the appropriate modules in both the device driver and the OS. Consequently, all communication into and out of a device driver being shadowed must occur through a procedure call. Fortunately, most device drivers operate this way. However, some do not, and therefore, cannot be shadowed using taps. For example, video architectures often split the device driver into OS kernel-mode and user-mode components, separated by a proprietary interface.

It should be noted that while an initial implementation of the approach discussed herein was implemented using the Linux™ OS, the present approach can also be employed with almost any other commercial OS. It is contemplated that shadow drivers can readily be provided for any of Microsoft Corporation's Windows™ OSs, or Apple Corporation's MacIntosh™ OSs, as well as for other OSs.

Shadow Manager

Figure 4:
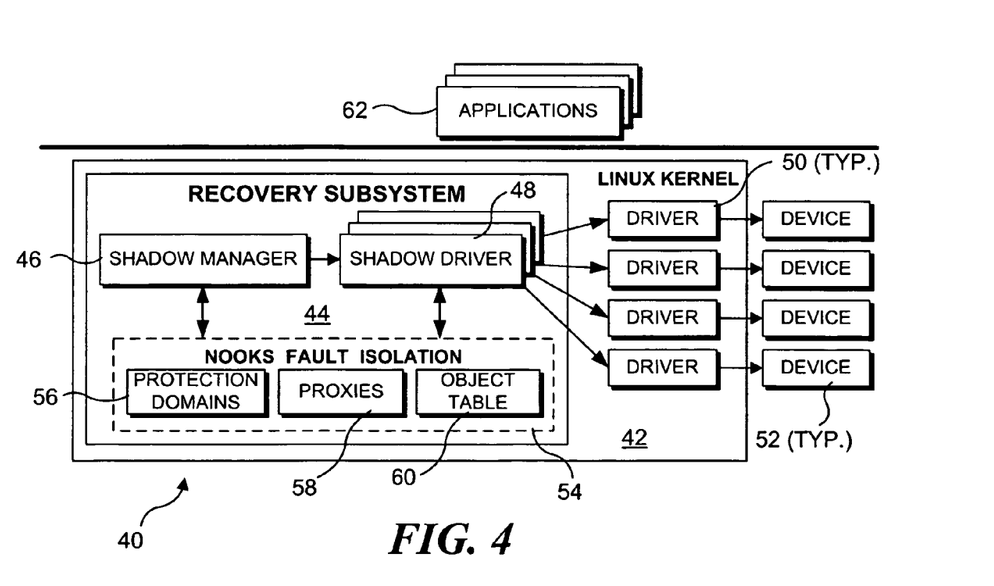
FIG. 4 is a functional block diagram of the OS kernel with several device drivers and the device driver recovery subsystem, wherein the new code components consist of the shadow manager and a set of shadow drivers, built on top of an earlier device driver fault isolation system (Nooks™)

FIG. 4 is a block diagram 40 that illustrates a device driver reliability subsystem 44 used in connection with a Linux OS kernel 42. Recovery is supervised by a shadow manager 46, which is a single OS kernel agent that interfaces with and controls all shadow drivers being used on the OS. The shadow manager instantiates new shadow drivers, such as shadow drivers 48 and injects taps into the call interfaces between their corresponding device drivers 50, and the Linux OS kernel. Device drivers 50 are provided for each device 52 used by the OS. The shadow manager also registers with the OS's reliability subsystem (for example, Nooks™) to receive failure notifications.

When a device driver fails, the shadow manager transitions taps and shadow drivers to active mode. In this mode, requests for the device driver's services are sent to an appropriately prepared shadow driver. The shadow manager then directs the shadow driver through the recovery sequence to restore the device driver. When recovery ends, the shadow manager switches the shadow driver and taps back to passive-mode operation so the device driver can resume service.

Shadow Driver Implementation

The shadow driver architecture strives to simplify the coding and integration of shadow drivers into existing systems. Each shadow driver is a single module written with explicit knowledge of the behavior (interface) of a class of device drivers, enabling it to conceal the failure of a device driver and correctly restart the device driver after a fault. Shadow drivers normally operate in passive-mode, observing device driver/OS kernel communication. They switch to active mode when failures occur, substituting for the failed device driver and managing its recovery. The following section focuses on the details of shadow driver implementation.

In an initial test of the present invention, shadow drivers were implemented for three classes of device drivers in the Linux OS, including: sound card device drivers, network interface device drivers, and IDE disk and CD/ROM device drivers. This section describes the shadow driver implementation, starting with a review of the general infrastructure for shadow drivers, then describing passive mode operation, and finally, focusing on the recovery process for a failed device driver.

General Infrastructure

All shadow drivers share a generic service infrastructure that provides three functions. First is an isolation service, which prevents device driver errors from corrupting the OS kernel, thereby ensuring fail-stop device driver behavior. Second is a transparent redirection mechanism ("taps"), which can change the destination of OS kernel-device driver requests during and after recovery. Third is an object tracking service, which maintains an object table describing OS kernel resources created or held by the device driver.

The shadow driver implementation is built on top of a Linux™/Nooks™ device driver isolation subsystem 54, which provides support for the service infrastructure. Nooks™ isolates device drivers within separate OS kernel protection domains 56. The domains trap device driver faults while protecting the integrity of OS kernel memory. A wrapper mechanism interposes proxy procedures 58 on all communication, in both directions, between a device driver and the OS kernel. The tap code is inserted into these Nooks™ proxies to implement communication mirroring during passive-mode observation and redirection during active-mode recovery. Finally, object-tracking code in proxies 58 follows device driver memory allocation and deallocation requests and records object pointers passed into the device driver from the OS kernel. Based on this information, the proxies maintain an object table 60 describing all OS kernel objects held by a device driver. During recovery, a shadow driver uses object table 60 to perform "garbage collection" of OS kernel resources that are no longer needed.

This exemplary implementation also adds a shadow manager to Linux™. As described above, the shadow manager has two responsibilities. First, it receives notification of device driver errors and directs the recovery, as discussed in detail below. Second, the shadow manager handles the initial installation of shadow drivers. In Linux™, the module loader consults a configuration file to learn the device driver's type when it is loaded and passes this information to the OS kernel. The Linux™ OS kernel was modified to pass this information to the shadow manager. On receiving this information, the shadow manager selects the appropriate shadow driver for the device driver, loads it into the system, and hooks it into the device driver by inserting taps into the OS kernel-interface proxies for the device driver.

Because a single shadow driver services a class of device drivers, there may be several instances of a shadow driver executing at any time. When a new device driver is loaded, for example, to service any application 62 that is being executed by Linux™ OS kernel 42, the shadow manager creates a new shadow driver instance for that device driver. The new instance shares the same code with all other instances of that shadow driver class. The reliability subsystem contains the shadow manager and a set of shadow drivers, each of which can handle one or more device drivers. The shadow manager and shadow drivers use services provided by the Nooks™ device driver isolation system.

Passive-Mode Observation

Shadow drivers most often execute in passive mode. In this mode, the shadow driver tracks the state of a device driver and device driver-related OS kernel data structures so it can provide transparent recovery and reintegration in case of failure. Tracking is enabled by taps on all OS kernel/device driver communication, which are provided by the shadowing infrastructure. The tap merely delivers information to the shadow driver. The shadow driver itself must determine what device driver state, if any, has changed, based on a tapped communication.

The passive-mode shadow driver tracks three types of information. First, it tracks requests made to the device driver. Request tracking depends on the device driver and its OS kernel interface. For connection-oriented device drivers, the shadow driver records the state of each active connection, such as offset or positioning information, and any configuration passed through device IOCTL (Input/Output Control) commands. For request-oriented device drivers, the shadow driver maintains a log of pending commands and arguments. An entry remains in the log until a tapped call or its return indicate that the request has been handled.

Second, the shadow driver records any state that the OS kernel passes into the device driver, such as configuration parameters or OS kernel objects. During recovery, the shadow driver uses this information to act in the device driver's place, e.g., by returning the same information that was passed in previously and stored as state data. It also uses this information to reconfigure the device driver to its pre-failure state when restarting it. For example, the shadow driver sound device driver keeps a log of IOCTL calls (command numbers and arguments). This log makes it possible for the shadow driver for the exemplary sound device driver to: (1) act as the device driver by remembering the sound formats it supports; and, (2) recover the device driver by resetting properties (such as the volume and sound format in use, in this example).

Third, the shadow driver tracks all OS kernel objects that the device driver allocated or received from the OS kernel. These objects would otherwise be lost, causing a memory leak when the device driver fails. For example, the shadow driver must record all timer callbacks registered and all hardware resources owned, such as interrupt lines and I/O memory regions.

In many cases, passive-mode calls require the shadow driver to perform no work. Most calls are null procedures; thus, the shadow driver returns immediately to the caller. For example, the dominant calls to a sound-card device driver are read and write, which record or play sound. In passive mode, the shadow driver implements these calls as no-ops, since there is no need to copy the real-time sound data flowing through the device driver. For an IOCTL call, however, the sound-card shadow driver logs the command and data for the connection as part of the state of the device driver. Similarly, the shadow driver for an IDE disk does little or no work in passive mode, since the OS kernel and disk device driver handle all of the I/O and request queuing. Finally, for the network shadow driver, much of the work is already performed by the Nooks™ object-tracking system, which keeps references to outstanding packets.

The Active-Mode Recovery Process

A device driver typically fails by generating an illegal memory reference or passing an invalid parameter across an OS kernel interface. An OS kernel-level failure detector notices the failure and triggers the shadow manager, which begins to restore the device driver to its pre-failed state. The shadow manager locates the responsible shadow driver and communicates with it through a special interface. The three steps of recovery, described below, include: (1) unloading the failed device driver, (2) reloading and re-initializing the device driver from a clean state, and (3) transferring relevant device driver state into the new device driver.

Unloading the Failed Device Driver

The shadow manager begins recovery by contacting the shadow driver and informing it that a failure of the device driver being shadowed has occurred. It also switches the taps, isolating the OS kernel and device driver from one another's subsequent activity during recovery. After this point in time, the tap redirects all OS kernel requests to the shadow manager, until recovery of the device driver is complete.

Informed of the failure, the shadow driver first disables execution of the failed device driver. It also disables the hardware device for which the device driver provides an interface function, to prevent it from interfering with the OS while not under device driver control. For example, the shadow driver disables the device driver's interrupt request line. Otherwise, the associated hardware device may continuously interrupt the OS kernel and prevent recovery. On some hardware platforms, the shadow driver would remove memory mappings used by the device to prevent direct memory accesses (DMAs) into OS kernel memory. The shadow driver then unloads the device driver, removing it from the OS kernel.

To prepare for restarting the device driver, the shadow driver next deallocates selected device driver-held OS kernel resources. The resources released are typically transient objects, such as dynamic memory that the device driver allocated to store its own state, or device driver wait queues for blocking callers. Because the OS kernel does not associate these objects with the device driver and its services, freeing them is invisible to the OS kernel and does not adversely impact the OS kernel operation. The shadow driver retains objects that the OS kernel uses to explicitly request device driver services, such as the device driver object or connection objects. This approach ensures that the OS kernel does not see the device driver "disappear" as the shadow driver switches to passive mode and the device driver is restarted.

Reloading and Re-Initializing the Device Driver

The shadow driver next "reboots" the device driver from a clean state. Normally, restarting a device driver requires reloading the device driver from disk. However, it cannot be assumed that the disk is functional during recovery. For this reason, when creating a new shadow driver instance, the shadow manager caches in the instance a copy of the device driver's initial, clean data section. These data sections tend to be quite small. The device driver's code is OS kernel-read-only, so it is not cached and can be reused from memory.

The shadow driver restarts the device driver by initializing the device driver's state and then replicating the OS kernel's device driver initialization sequence. For some device driver classes, such as sound card device drivers, this process may consist of a single call into the device driver's initialization routine. Other device drivers, such as network interface device drivers, require additional calls to connect the device driver into the network stack.

The shadow driver next reattaches the device driver to its pre-failure OS kernel resources. During device driver reboot, the device driver makes a number of calls into the OS kernel to discover information about itself and to link itself into the OS kernel. For example, when a device driver restarts, it calls the OS kernel to register itself as a device driver and to request hardware and OS kernel resources. The taps redirect these calls to the shadow driver, which reconnects the device driver to existing OS kernel data structures. Thus, when the device driver attempts to register with the OS kernel, the shadow driver intercepts the call and reuses the existing device driver object, avoiding the allocation of a new one. For requests that generate callbacks, such as a request to register the device driver with the PCI subsystem, the shadow driver emulates the OS kernel, making the same callbacks to the device driver with the same parameters. In essence, the shadow driver initializes the recovering device driver by calling and responding as the OS kernel would when the device driver restarts. The shadow driver is thus not evident to the device driver when the device driver is being restarted.

As the device driver initializes, it also acquires hardware resources. If these resources were previously disabled at the first step of recovery, the shadow driver re-enables them, e.g., by re-enabling interrupt handling for the device's interrupt line.

Transferring State to the New Device Driver

The final recovery step restores the device driver to the state that existed at the fault, permitting it to respond to requests as if it had never failed. Thus, any properties that either the OS kernel or an application had downloaded to the device driver must be restored. Furthermore, any requests that were in progress or connections that were open at the time of failure must be restarted.

The details of this final state transfer depend on the device driver class. Some device drivers are connection oriented. For these, the remaining state consists of the state of the connections before the failure. The shadow driver re-opens the connections and resets the state of each active connection with IOCTL calls. Other device drivers are request oriented. For these, the shadow driver resets the state of the device driver (again with IOCTL calls) and then resubmits to the device driver any requests that were outstanding when the device driver crashed.

As an example, for a failed sound card device driver, the shadow driver scans the state of the device driver in memory, specifically scanning the list of open connections and then calls the open function in the device driver, to reopen each connection in the list. The shadow driver then walks its log of IOCTL commands (also part of the state data) and replays all commands that set device driver properties.

For some device driver classes, the shadow driver cannot completely transfer its state into the device driver. However, it may be possible to compensate in other (albeit less elegant) ways. For example, a sound device driver that is recording sound input stores the number of bytes it has recorded since the last reset. After recovery, the sound device driver initializes this counter to zero. Because no interface call is provided to change the counter value, the shadow driver must insert its "true" value into the return argument list whenever the application reads the counter to maintain the illusion that the device driver has not crashed. The shadow driver can do this because it receives control (on its mirrored call) before the OS kernel returns to user space with the restarted device driver.

After resetting device driver and connection state, the shadow driver must handle requests that were either outstanding when the device driver crashed or arrived while the device driver was recovering. Unfortunately, shadow drivers cannot guarantee exactly one time behavior for device driver requests and must rely on devices and higher levels of software to absorb duplicate requests. For example, if a device driver crashes after submitting a request to a device but before notifying the OS kernel that the request has completed, the shadow driver cannot know whether the request was actually processed by the OS kernel. During recovery, the shadow driver has two choices—restart in-progress requests and risk duplication, or cancel the request and risk lost data. For some device driver classes, such as disks or networks, duplication is acceptable. However, other device driver classes may not tolerate duplicates. In these cases, the shadow driver instead cancels outstanding requests.

After this final step, the device driver has been re-initialized, linked into the OS kernel, reloaded with its pre-failure state, and is ready to process commands. At this point, the shadow driver notifies the shadow manager, which switches the taps to restore OS kernel-device driver communication and reestablish passive-mode monitoring.

Active Proxying of OS Kernel Requests

While a shadow driver is restoring a failed device driver, it is also acting in place of the device driver (but without its full functionality) to conceal the failure and the recovery of the device driver from applications and the OS kernel. For each OS kernel request during this period, the shadow driver's actions depend on the device driver class and the semantics of the request. In general, the shadow driver will take one of five actions: (1) respond with information that the shadow driver has recorded; (2) silently drop the request; (3) queue the request for later processing; (4) block the request until the device driver recovers; or, (5) report that the device driver is busy and the OS kernel or application should try again later.

Writing a shadow driver that successfully proxies for a failed device driver requires knowledge of the OS kernel-device driver interface, interactions, and requirements. For example, the OS kernel may require that some device driver functions are never blocked, while others are always blocked during a device driver failure. Or, some OS kernel requests are idempotent (e.g., many IOCTL commands), permitting duplicate requests to be dropped, while others return different results on every call (e.g., many read requests). The shadow driver for a device driver class uses these requirements to select the response strategy.

Some device driver interfaces support a notion of "busy," which enables the shadow driver to simply instruct the OS kernel to block calls. For example, network devices in Linux may reject requests and turn themselves off if their queues are full. The OS kernel then refrains from sending packets until the device driver turns itself back on. In this implementation of the present invention, the shadow driver network device driver exploits this behavior during recovery by returning a "busy" error on send packet calls. IDE device drivers support a similar notion when request queues fill up. Sound device drivers can report that their buffers are temporarily full.

The shadow driver sound-card device driver uses a mix of all five strategies for emulating different functions in its service interface. The shadow driver blocks OS kernel read and write requests, which play or record sound samples, until the failed device driver recovers. The shadow driver processes IOCTL calls directly, either by responding with information it captured or by logging the request to be processed later. For IOCTL commands that are idempotent, the shadow driver silently drops duplicate requests. Finally, when applications query for buffer space, the shadow driver responds that buffers are full. As a result, applications block themselves rather than requiring that the blocking occur in the shadow driver.

Flowcharts Showing Logical Steps for Implementing Approach

Figure 7:
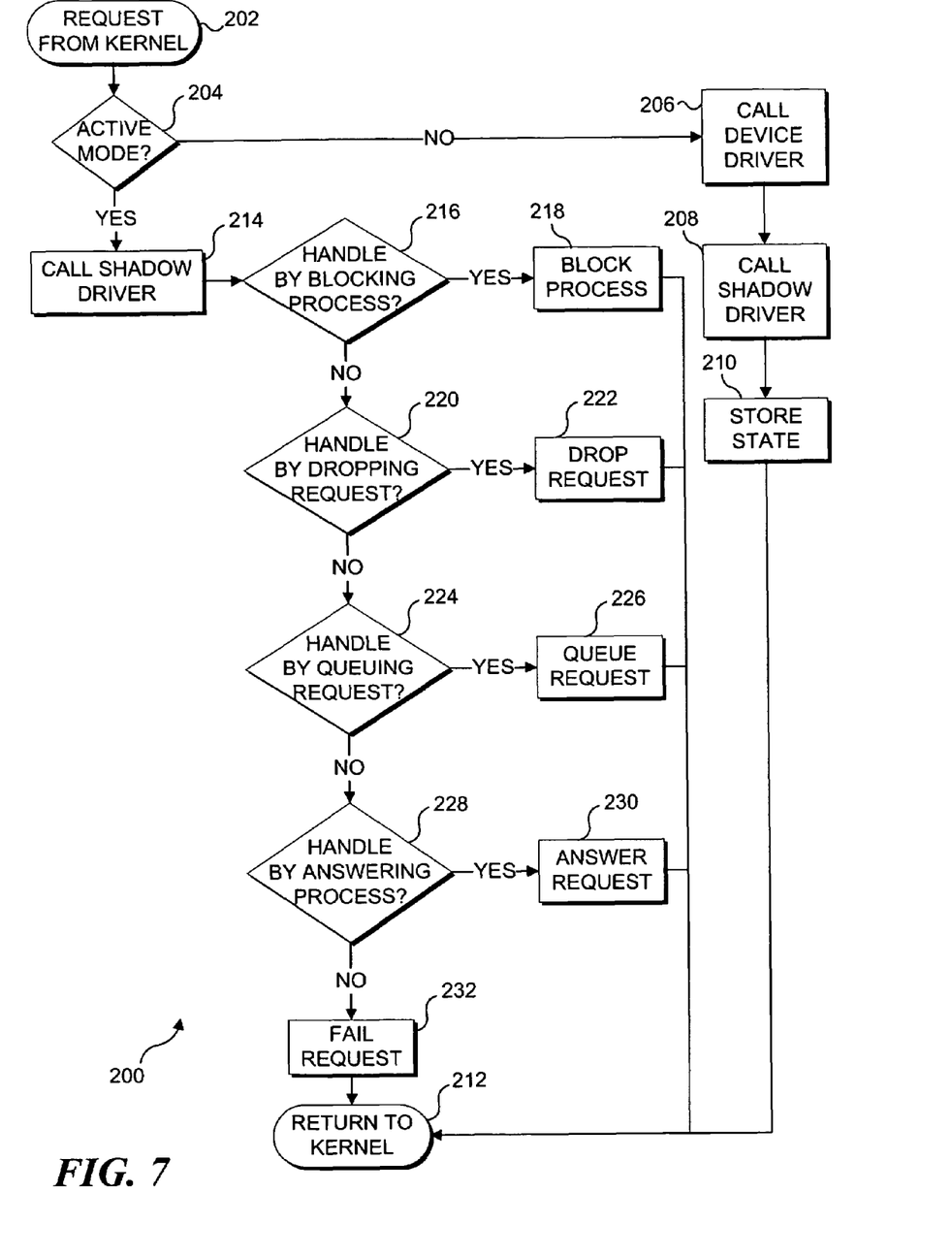
FIG. 7 is a flow chart showing the logical steps employed by the present approach in handling requests from the OS kernel.
Figure 8:
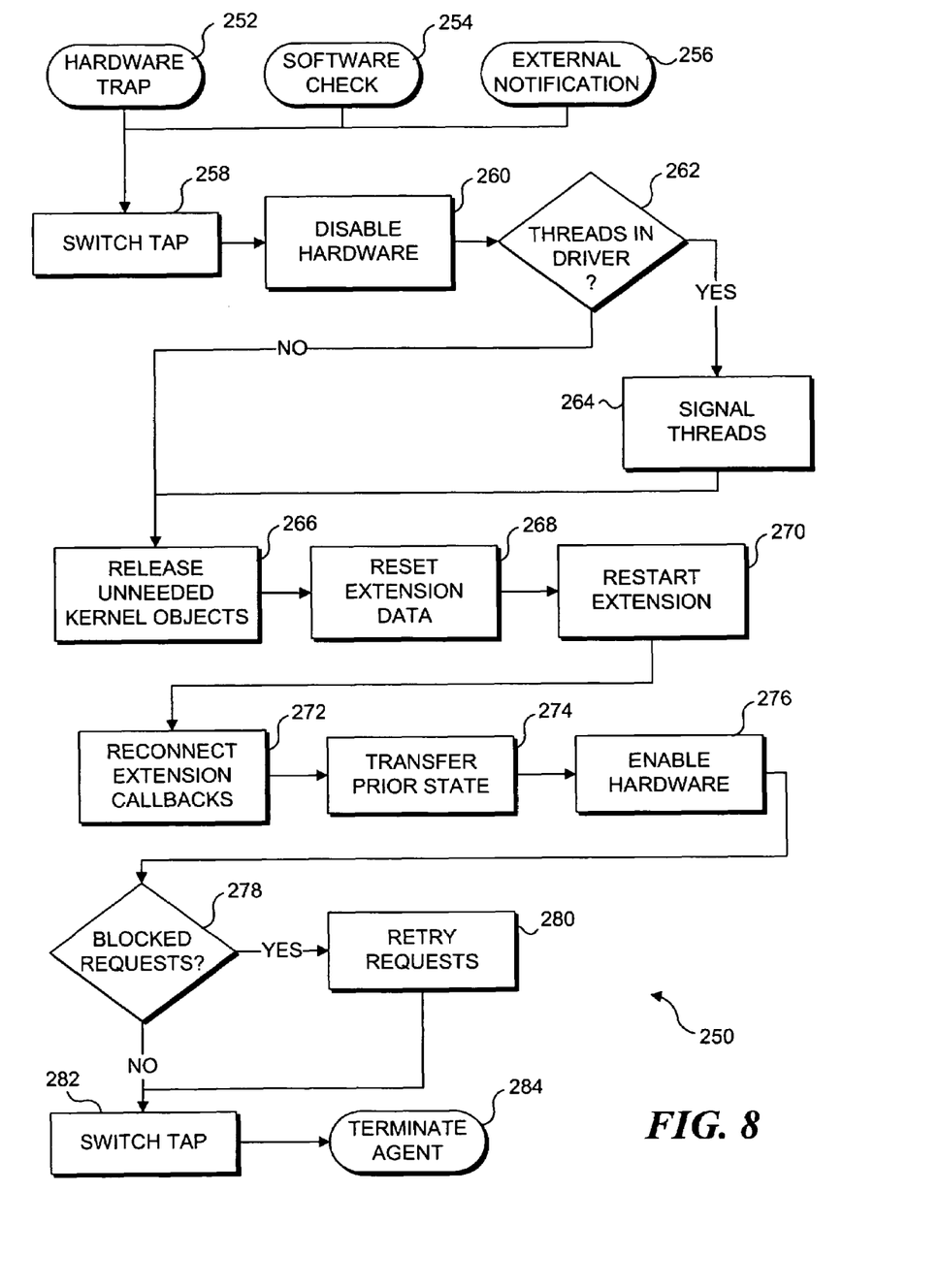
FIG. 8 is a flow chart showing the logical steps employed by the present approach in handling the recovery from a device driver fault.

A flowchart 200 in FIG. 7 illustrates the logical steps implemented by the present approach in handling requests from the OS kernel, while a flowchart 250 in FIG. 8 illustrates the logical steps implemented in handling recovery from a device driver fault. These steps have been generally described above and are only briefly discussed in this section.

Referring to FIG. 7, a step 202 indicates that a request from the OS kernel is detected on the communication between the OS kernel interface and the device driver being shadowed. A decision step 204 determines if the shadow driver is operating in its active mode to recover from a device driver fault. If not, a step 206 calls the device driver to communicate the request from the OS kernel. A step 208 then calls the shadow driver to copy the request to it. In response, the shadow driver stores the request as part of the state of the device driver, in a step 210. The logic then returns to the OS kernel in a step 212.

If the shadow driver is operating in its active mode because the device driver has failed, a step 214 calls the shadow driver so that it can deal with the request from the OS kernel. A decision step 216 then determines if the request should be handled by blocking the process currently ongoing. If so, a step 218 provides for blocking the process. Otherwise, a decision step 220 determines if the request should be handled by simply dropping the request. For some devices and processes, it will not be possible to cache the request until the driver is restarted, so dropping the request will be preferable, as indicated in step 222. Alternatively, a decision step 224 determines if the request should be placed in a queue, to await restart of the device driver. If so, a step 226 queues the request. Otherwise, a decision step 228 determines if the request is to be handled by answering it, for example, with data included in the stored state. If so, the request is answered in a step 230. Otherwise, a step 232 simply fails the request, which will likely cause the OS kernel to repeat the request, so that after the device driver is restarted by the shadow driver, the repeated request will be handled by the restarted device driver. Thereafter, or after any of steps 218, 222, 226, and 230, the logic proceeds to step 212, which provides for returning to the OS kernel.

With reference to FIG. 8, a device driver failure is detected by either a hardware trap, in a step 252, or a software check, in a step 254, or an external notification that the device driver has failed, in a step 256. In response to any of these mechanisms used for detecting a failed device driver, a step 258 provides for switching the taps from the passive mode, to the active mode, corresponding to the modes of the shadow driver. Direct communication between the device driver and the OS kernel interface is precluded when the taps and the shadow driver are in the active mode, and all communication is between the OS kernel interface and the corresponding interface of the shadow driver, and between the device driver class interface and the corresponding interface of the shadow driver (as shown in FIG. 3). Then, a step 260 provides for disabling the device or hardware that the device driver serves. A decision step 262 determines if any threads were active in the device driver, and if so, a step 264 signals each such thread to terminate. A step 266 releases unneeded OS kernel objects, for example, to free resources that may have been improperly employed by the device driver as it was beginning to fail. A step 268 resets the extension data for the device driver, and a step 270 restarts the extension. In a step 272, the shadow driver reconnects the extension callbacks. A step 274 transfers the prior state that was previously saved, to the device driver, so that it can be restarted without appearing to have failed. A step 276 enables the hardware with which the device driver is associated. A decision step 278 determines if any requests were blocked while the device driver was failed and being restarted, and if so, a step 280 retries the requests. After step 280 or if no requests were blocked, a step 282 restores the taps to the passive state (as shown in FIG. 1). The shadow driver agent is then terminated (i.e., switched to passive mode) in a step 284, since the device driver has now been restarted and should be functioning.

Limitations

Several limitations of the shadow driver architecture and implementation have been described above, but these are aggregated and summarized in the following discussion. First and foremost, shadow drivers rely on dynamic unloading and reloading of device drivers. If a device driver cannot be reloaded dynamically, or will not re-initialize properly, then a shadow driver cannot recover the device driver following a failure. Second, shadow drivers rely on taps to mirror and redirect all communication between the device driver and OS kernel. If device driver-OS kernel communications take place through a proprietary or ad hoc interface (such as shared memory), the shadow manager cannot automatically insert taps. Further, a separate shadow driver would be required for each proprietary interface, which is likely impractical. Third, shadow drivers assume that device driver failure does not cause irreversible side effects. If a corrupted device driver stores persistent state (e.g., printing a bad check or writing bad data on a disk or CD/ROM), the shadow driver will not be able to correct that undesired action.

The effectiveness of shadow drivers is also limited by the properties of the isolation and failure-detection subsystem. If this layer cannot prevent OS kernel corruption, then shadow drivers cannot fully recover the system to a desired state. In addition, if the fault-isolation subsystem does not detect a failure, then shadow drivers will not be properly invoked to perform recovery and restart of the failed device driver.

Details of Exemplar Linux™ Shadow Driver Implementation

This section presents the details of the Linux™ shadow driver implementation. The shadow driver concept is straightforward: passively observe normal operations, proxy during failure, and reintegrate during recovery. Ultimately, the value of shadow drivers depends on the degree to which they can be implemented correctly, efficiently, and easily in an OS. The following section evaluates some of these questions both qualitatively and quantitatively.

Evaluation

Shadow drivers are evaluated according to three criteria:
1. Fault-Tolerance. Can applications that use a device driver continue to run even after the device driver fails? This criterion is the "litmus test" of the effectiveness and benefit of the shadow driver concept.
2. Performance. What is the performance overhead of shadow drivers during normal operation (i.e., in the absence of failure)? This criterion is the dynamic cost of the mechanism.
3. Code size. How much code is required for shadow drivers and their supporting infrastructure? This criterion is the engineering cost of building and integrating shadow drivers into an existing system.

Based on experiments of applications executing with failing device drivers, results show that shadow drivers: (1) mask device driver failures from applications; (2) impose relatively little performance overhead; and, (3) can be implemented with a modest amount of code.

TABLE 1

Three classes of shadow drivers were implemented for the Linux device drivers on which they were tested. Results are discussed only for the device drivers identified by bold font (i.e., e1000, emu10k1, & ide-disk).

| Class | device driver | Device |
| --- | --- | --- |
| Network | e1000 | Intel Pro/1000 Gigabit Ethernet |
|  | pcnet32 | AMD PCnet32 10/100 Ethernet |
|  | 3c59x | 3COM 3c509b 10/100 Ethernet |
|  | e100 | Intel Pro/100 Ethernet |
|  | epic100 | MC EtherPower 10/100 Ethernet |
| Sound | emu10k1 | SoundBlaster Live! sound card |
|  | sb | SoundBlaster 16 sound card |
|  | es1371 | Ensoniq sound card |
|  | cs4232 | Crystal sound card |
|  | i810 audio | Intel 810 sound card |
| IDE | ide-disk | IDE disk |
|  | ide-cd | IDE CD-ROM |

The experiments were run on a 1.7 GHz Intel Pentium 4™ personal computer with 890 MB of RAM and a 41 GB, 7200 RPM IDE disk drive. Three Linux™ shadow drivers were tested for three device driver classes: network interface controller, sound card, and IDE disk. To ensure that the generic shadow drivers worked consistently across device driver implementations, there were tested on twelve different Linux™ device drivers, as shown in Table 1. To simplify this evaluation, results are discussed for only one Linux™ device driver in each class: e1000 (Gigabit Ethernet), emu10k1 (SoundBlaster sound card), and ide-disk (IDE disk drive).

Fault-Tolerance

The crucial question for shadow drivers is that of application fault tolerance: can an application continue functioning during and after the failure of a device driver upon which it relies? To answer this question, three OS configurations were produced based on the Linux™ version 2.4.18 OS kernel:

1. Linux™-Native is the unmodified Linux™ OS kernel.
2. Linux™-Nooks™ is a version of Linux™-Native that includes the Nooks™ fault-isolation system. When a device driver fails, this system simply restarts the device driver. It does not advance the device driver to its pre-failed state or offer active shadowing during recovery.
3. Linux™-SD is a version of Linux™-Nooks™ that includes the shadow driver infrastructure and the three shadow drivers.

Ten applications were tested on these configurations. The applications were chosen to exercise the three device driver classes that the shadow drivers support. For each test, common bugs were simulated by injecting a software fault into a device driver while an application using that device driver was running. The behavior of the application was then observed.

TABLE 2

The observed behavior of several applications following the failure of the device drivers on which they rely. There are three behaviors: a checkmark (p) indicates that the application continued to operate normally; CRASH indicates that the application failed completely (i.e., it terminated); MALFUNCTION indicates that while the application continued to run, its behavior was abnormal.

| device driver | Application Activity | Application Behavior | | |
| --- | --- | --- | --- | --- |
| | | Linux-Native | Linux-Nooks™ | Linux-SD |
| Sound (emu10k1 device driver) | mp3 player (zinf) playing 128 kb/s audio | CRASH | MALFUNCTION | p |
| | audio recorder (audacity) recording from microphone | CRASH | MALFUNCTION | p |
| | speech synthesizer (festival) reading a text file | CRASH | p | p |
| | strategy game (Battle of Wesnoth) | CRASH | CRASH | p |
| Network (e1000 device driver) | network file transfer (scp) of a 100 MB file | CRASH | p | p |
| | remote window manager (vnc) | CRASH | p | p |
| | network analyzer (ethereal) sniffing packets | CRASH | MALFUNCTION | p |
| IDE (ide-disk device driver) | compiler (make/gcc) compiling 788 C files | CRASH | CRASH | p |
| | encoder (LAME) converting 90 MB file .wav to .mp3 | CRASH | CRASH | p |
| | database (mySQL) processing the Wisconsin Benchmark | CRASH | CRASH | p |

Table 2, above, shows the three application behaviors observed. In the face of device driver failure, each application either: continued to run normally (p); failed completely ("CRASH"); or continued to run but behaved abnormally ("MALFUNCTION"), typically requiring manual intervention to reset or terminate the program. This table clearly demonstrates that with shadow drivers (Linux™-SD), applications continue to run normally even as device drivers failed. In contrast, all applications on Linux™-Native failed when device drivers failed. Most test programs running on Linux™-Nooks™ failed or demonstrated abnormal behavior as well, despite the Nooks™ device driver isolation system.

For Linux™-Native, the results were not surprising: all of the tests except one caused Linux™-Native to crash. For mp3 player, the OS survived the device driver failure but terminated the application. This difference results from the treatment of device driver faults in the Linux™ OS kernel. Linux™ executes device driver code in either process-mode, when responding to an application's system call request, or in interrupt-mode, when responding to an interrupt. An interrupt-mode failure always results in a system crash. In contrast, a process-mode failure causes the requesting application process to fail (i.e., Linux™ kills the application). Other OSs, such as Microsoft Corporation's Windows XP™ OS, are more conservative when encountering OS kernel-mode errors and crash the OS after any device driver fault.

The comparison of Linux™-SD with Linux™-Nooks™ is more instructive and shows the benefits of shadow drivers relative to the protection offered by Nooks. Nooks™ isolates the OS kernel from device driver faults and reboots (unloads, reloads, and restarts) the device driver. However, it lacks two key features of shadow drivers: (1) it does not advance the device driver to its pre-fail state, and (2) it has no component to "pinch hit" for the failed device driver during recovery. As a result, Linux™-Nooks™ handles device driver failures by returning an error to the application, leaving it to recover by itself. Unfortunately, few applications are so robustly designed.

Some applications on Linux™-Nooks™ survived the device driver failure, although not without crippling effects. For example, mp3 player and audio recorder continued running, but malfunctioned and lost their ability to produce or consume sounds until the user manually reconfigured. Similarly, network analyzer, which interfaces directly with the network device driver, lost its ability to receive packets once the device driver was reloaded. Therefore, packet sniffing had to be manually restarted. Finally, strategy game became non-responsive while waiting for a status message from a previous incarnation of the device driver. Since this message would never arrive, the process had to be killed manually.

Three applications continued to function properly after device driver failure on Linux™-Nooks™. For example, speech synthesizer includes the code to reestablish its context within an unreliable sound card device driver. Two of the network applications survived on Linux™-Nooks™ because they accessed the network device driver through OS kernel services (TCP/IP and sockets) that are themselves resilient to device driver failures. As Table 2 shows, this resilience is irrelevant for Linux™-Native, because the system or program crashes.

The failure of the three disk-oriented applications under Linux™-Nooks™ illustrates that device driver state can be frustratingly pervasive. Following its failure, the IDE device driver, which had been unloaded from the OS kernel, was then required to reload itself. The circularity could only be resolved by a system reboot. While a second non-IDE disk would mitigate this problem, few machines are configured this way. Even fewer run with two disks on two different controllers using independent device drivers.

In contrast, Linux-SD recovers transparently from disk device driver failures, because the IDE shadow driver instance for the failing IDE device driver maintains a copy of the device driver's initial state, including its code and data. The value of automatic state recovery thus becomes clear in light of the different behaviors under the various configurations. In general, programs that directly depend on device driver state but are unprepared to deal with its loss benefit the most from shadow drivers. In contrast, those that do not directly depend on device driver state benefit the least. Similarly, those designed to recover from the loss of device driver state also receive little benefit from shadow drivers.

Experience suggests that few applications are as fault-tolerant as speech synthesizer. Were future applications to be pushed in this direction, software manufacturers would either need to develop custom recovery solutions on a per-application basis or find a general solution that could protect any application from the failure of an OS kernel device driver. Cost is a barrier to the first approach. Shadow drivers are a path to the second.

Application Behavior During Recovery

Although shadow drivers prevented application failure, they are not "real" device drivers and do not provide complete device services. As a result, a slight timing disruption was often observed while the device driver recovered. At best, output was queued in the shadow driver. At worst, input was lost by the device. The length of the delay was primarily determined by the recovering device driver itself, which, on (re)initialization, must first discover and then configure the hardware.

Few device drivers implement fast reconfiguration, leading to brief recovery delays. For example, the temporary loss of the e1000 network device driver prevented applications from receiving packets for about five seconds. Programs using files stored on the disk managed by the ide-disk device driver stalled for about four seconds during recovery. In contrast, the normally smooth sounds produced by the emu10k1 device driver were interrupted by a pause of about one-tenth of a second, which sounds like a slight click in the audio stream.

Of course, the significance of these delays depends on the application. Streaming applications may become unacceptably "jittery" during recovery. Those processing input data in real-time might become lossy. Others may simply run a few seconds longer in response to a disk that appears to be operating more sluggishly than usual. In any event, a short delay during recovery is best considered in light of the non-shadow driver-device driver alternative, i.e., application failure.

Performance

The second criterion evaluated is performance, i.e., what is the performance cost of shadow drivers during normal (failure-free) operation? To answer this question, the performance of nine applications that exercised the three shadow drivers was measured. Different applications have different metrics of interest. For the disk device driver and sound device driver, the applications shown in Table 2 were run, and elapsed time was measured. For the network device driver, throughput is a more useful metric; therefore, throughput-oriented network send and network receive benchmarks were substituted for the programs shown in Table 2. Also measured was CPU utilization while those programs ran. All measurements were repeated several times and showed variation of less than one percent.

Figure 5:
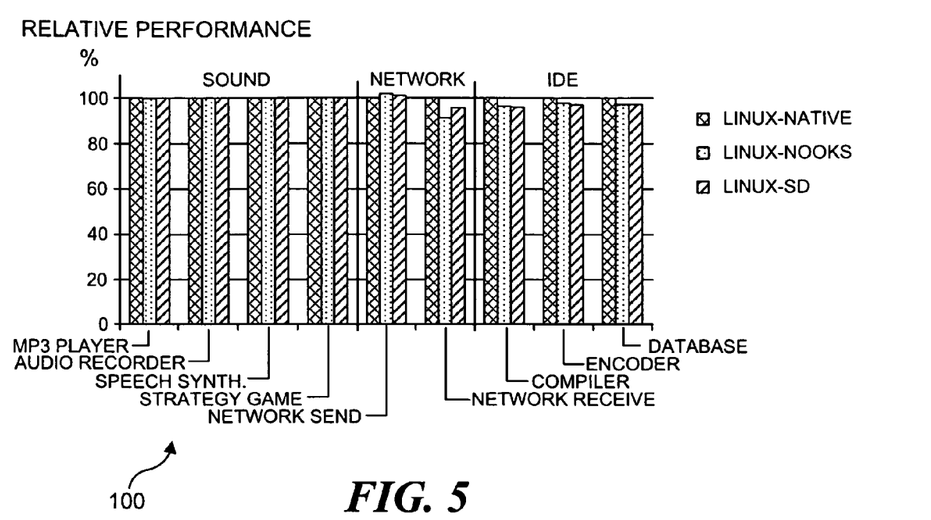
FIG. 5 is a graph comparing application performance, relative to Linux-Native, for three configurations.
Figure 6:
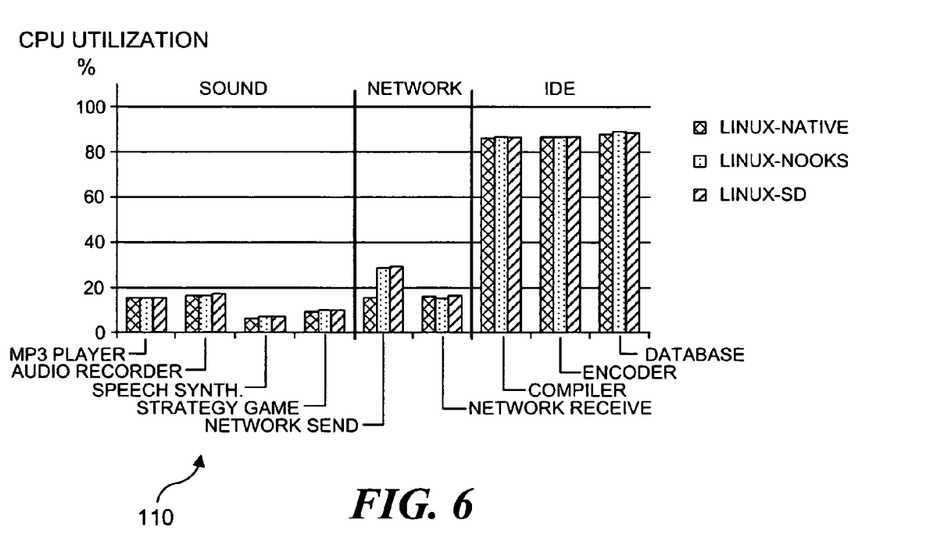
FIG. 6 is a graph showing absolute CPU utilization by an application for the three configurations of FIG. 5.

FIG. 5 is a bar graph 100 that shows the performance of Linux™-Nooks™ and Linux™-SD relative to Linux™-Native. FIG. 6 is a bar graph 110 that compares CPU utilization for execution of the same applications on the three OS versions. Overall, these Figures make clear that shadow drivers (and isolation in general) impose an extremely modest impact on both performance and CPU utilization during normal operation.

The low performance overhead of shadow drivers may be surprising and is explained by a quick review of passive-mode behavior. First, overhead is introduced by the Nooks™ fault-isolation system, which runs each device driver in its own protection domain. Second, overhead is introduced by shadow drivers and the costs of passive-mode communication and state maintenance. In the first case, the overhead is directly related to the number of domain crossings on each interaction (procedure call) between the OS kernel and device driver. For audio recorder, the most intensive sound-card application, the OS kernel and device driver interact approximately 1000 times per second. For the most disk-intensive of the disk applications, the database benchmark, the device driver calls the OS kernel only 200 times per second.

Neither of these interactions is likely to have a noticeable performance impact. On the other hand, the network send benchmark transmits 45,000 packets per second, causing 45,000 domain crossings. The associated overhead is visible in FIG. 6, where CPU utilization for this benchmark increases from 15% to 28% with device driver fault isolation.

From a comparison of the Linux™-Nooks™ and Linux™-SD bars in FIG. 5, the second effect—the cost of running the shadow driver in passive mode—is small or negligible. This may be surprising as well. However, as noted above, many passive-mode shadow driver-device driver functions are null calls. While the shadow driver requires various types of information for recovery, it can often benefit from the work of other system components that already maintain that information. For example, the OS kernel maintains the disk device driver request queue, which is used by the disk shadow driver during recovery. The Nooks™ object tracker remembers outstanding network packets, which are used by the network shadow driver during recovery. And the sound device driver does not need to track read and write requests during passive mode. As a result, the incremental passive-mode performance cost over basic fault isolation is low or virtually unmeasurable in many cases.

In summary, the performance measurements show that the overall performance penalty of shadow drivers is low. This result implies that shadow drivers could easily be used across a wide range of applications and environments.

Code Size

This section considers the issue of code complexity, which is examined from two points of view: the size of the shadow driver itself, and the modifications required to integrate shadow drivers into Linux.

TABLE 3

Shadow driver size compared to Linux ™ device driver size in lines of code. The table also shows the number of Linux ™ device drivers in each of the three classes and the cumulative lines of code in all of those device drivers.

| device driver Class | # of device drivers in Class | Code Size For All device drivers in Class | Example device driver Size | Shadow driver Code Size |
|---|---|---|---|---|
| Sound | 48 | 111,600 | 8080 (emu10k1) | 666 |
| Network | 190 | 264,500 | 9842 (e1000) | 198 |
| IDE Disk | 8 | 29,000 | 5358 (ide-disk) | 321 |

Table 3 presents code size in lines of code for the three device driver classes. For each class, the number of existing Linux™ device drivers and the cumulative lines of code for all device drivers in that class are shown. The total code size is presented as an indication of the leverage gained through the shadow driver's class-device driver structure. For comparison, the size of an example Linux™ device driver for each class, along with the size of the corresponding shadow driver for each class, are also shown. As the table indicates, a shadow driver is significantly simpler than the device driver it shadows. For example, the sound-card shadow driver is only 8% of the size of the emu10k1 device driver it shadows; the disk shadow driver is only 6% percent of the Linux™ ide-disk device driver.

Integrating shadow drivers into the Linux™ OS kernel was relatively simple and benefited greatly from the Nooks™ isolation layer that was built upon, which contains about 23,000 lines of code. Shadow drivers required the addition of approximately 600 lines of code for the shadow manager, 800 lines of common code shared by all shadow drivers, and another 750 lines of general utilities. In total, about 3300 lines of code were added to the Linux/Nooks™ system to support the three class device drivers.

Clearly, the code required to build and support shadow drivers is modest. The complexity of implementing the Nooks™ layer is more substantial, but represents a one-time cost that yields a variety of benefits. Given the size of modern OSs and their associated device drivers (millions of lines of code), and the enormous cost of device driver failure, it is apparent that shadow drivers and fault-isolation subsystems are a small and worthwhile addition.

SUMMARY OF CONCLUSIONS

An examination of the fault-tolerance, performance, and code size of shadow drivers demonstrate that: (1) applications that failed in any form on Linux™-Native or Linux™-Nooks™ ran normally with shadow drivers; (2) the performance overhead of shadow drivers during normal operation is small; and, (3) shadow drivers do not have a high implementation cost. Overall, these results indicate that shadow drivers have the potential to significantly improve the reliability of applications on modern OSs.

Improving the reliability of commodity systems demands that the quality of software be improved (to reduce the causes of failure) and that the resilience of the systems be increased (to reduce the effects of failure). It was to this end that shadow drivers were designed. Shadow drivers mask device driver failures from both the OS and applications. Unlike most recovery mechanisms, shadow drivers focus on a single goal: transparent recovery from device driver failures.

The experience discussed above shows that shadow drivers, while simple to implement and integrate, are highly leveraged, because a single shadow driver can enable recovery for an entire class of device drivers. They are also efficient, imposing virtually no performance degradation. They are transparent, requiring no code changes to existing device drivers. Finally, and most importantly, they improve application reliability, because they conceal a device driver's failure from applications and the OS while actively recovering the device driver to its pre-fail state.

Figure 9:
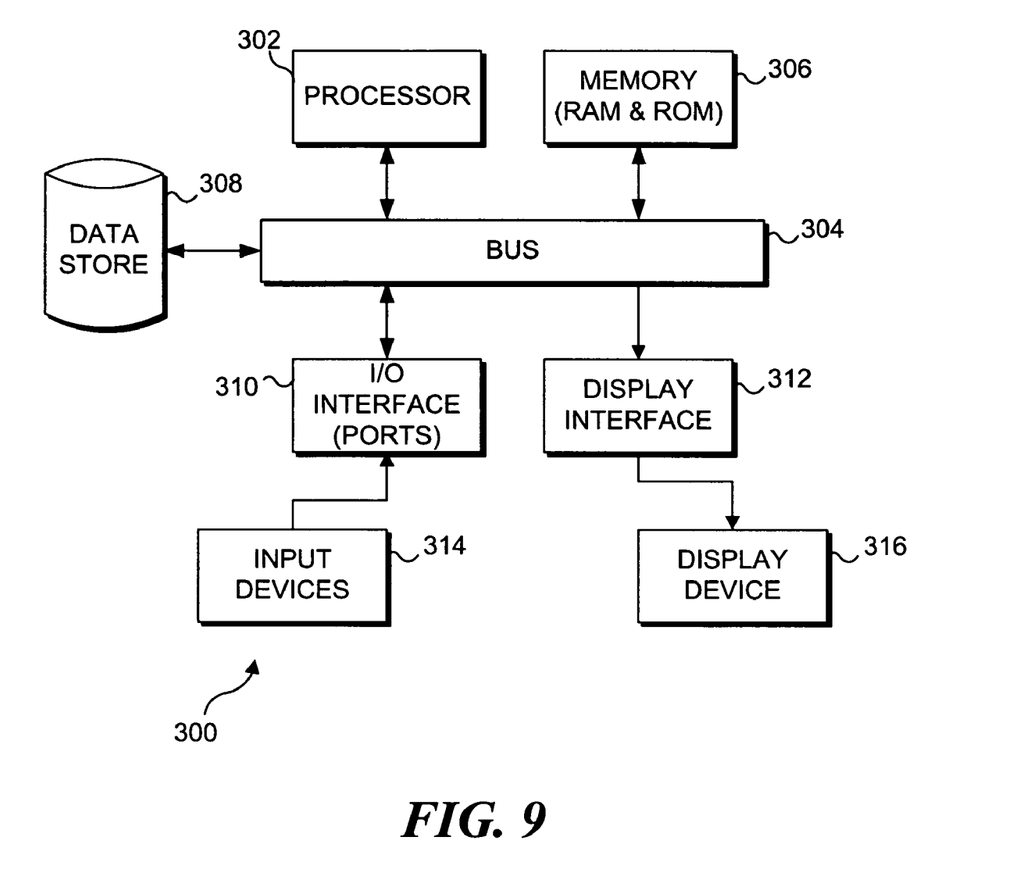
FIG. 9 is a functional block diagram of an exemplary computing device that is useful for employing the present approach for recovering device drivers.

FIG. 9 illustrates a simplified block diagram of a system or computing device 300 that is suitable for implementing the exemplary approach discussed above. The computing device can be a typical personal computer, but can take almost any other form, for example, a personal data assistant (PDA), a cell phone, or an appliance. This list of computing devices is not intended to be limiting in any respect. A processor 302 is employed for executing machine instructions that are stored in a memory 306. The machine instructions may be transferred to memory 306 from a data store 308 over a generally conventional bus 304, or may be provided on some other form of memory media (i.e., computer readable memory medium), such as a digital versatile disk (DVD), a compact disk read only memory (CD-ROM), or other non-volatile memory device. Processor 302, memory 306, and data store 308, which may be one or more hard drive disks or other non-volatile memory, are all connected in communication with each other via bus 304. Also connected to the bus are an input/output interface 310 (which may include one or more data ports such as a serial port, a universal serial bus (USB) port, a Firewire (IEEE 1394) port, a parallel port, a personal system/2 (PS/2) port, etc.), and a display interface or adaptor 312. Any one or more of a number of different input devices 314 such as a keyboard, mouse or other pointing device, trackball, touch screen input, etc. are connected to I/O interface 310. A monitor or other display device 316 is coupled to display interface 312, so that a user can view graphics and text produced by the computing system as a result of executing the machine instructions, both in regard to an operating system and any applications being executed by the computing system, enabling a user to interact with the system.

Although the concepts disclosed herein have been described in connection with the preferred form of practicing them and modifications thereto, those of ordinary skill in the art will understand that many other modifications can be made thereto within the scope of the claims that follow.

Accordingly, it is not intended that the scope of these concepts in any way be limited by the above description, but instead be determined entirely by reference to the claims that follow.

The invention in which an exclusive right is claimed is defined by the following:

1. A method for recovering from a failure of a component executing on a computing device, by using a shadow process for impersonating the failed component during recovery but without providing the functionality of the failed component, comprising the steps of:
    (a) monitoring communications between the component and an extensible system on the computing device;
    (b) using the shadow process for storing data for the component that were received from the extensible system and were being provided to the component, where said data are derived from the communications;
    (c) detecting a failure of the component;
    (d) responsive to detecting the failure, temporarily halting interaction of the component with the extensible system and acting in place of the component that failed without providing the functionality of the component during recovery, by answering requests on behalf of the component using the shadow process; and
    (e) re-initializing the component using the data that were stored, so that the component is restored to full functionality and is enabled to again interact with the extensible system.

2. The method of claim 1, further comprising the step of hiding the failure of the component from the extensible system, so that the failure of the component does not adversely impact functionality of the extensible system and any software application using the component.

3. The method of claim 1, wherein the failure of the component causes communications between the extensible system and the component to be diverted so that the component and extensible system do not directly communicate until the component has been re-initialized.

4. A method for recovering from a failure of a device driver executing on a computing device, comprising the steps of:
    (a) employing a shadow driver for monitoring communications between the device driver and an OS kernel to determine a state of the device driver;
    (b) storing the state of the device driver in a memory;
    (c) detecting a failure of the device driver, and in response:
        (i) temporarily interrupting communications between the device driver and the OS kernel; and
        (ii) employing the shadow driver to successively unload the device driver, reload the device driver, and re-initialize the device driver to the state that was stored in the memory; and
    (d) restoring communications between the device driver that has been re-initialized and the OS kernel, so that the device driver is recovered from the failure.

5. The method of claim 4, wherein the shadow driver is specifically designed for a class of device drivers in which the device driver is included.

6. The method of claim 4, further comprising the step of employing the shadow driver to mask the failure of the device driver from the OS kernel by enabling the shadow driver to communicate with the OS kernel after the device driver fails and until the device driver is re-initialized, although the shadow driver does not function as a replacement for the device driver.

7. The method of claim 6, further comprising the step of employing the shadow driver to block a request intended for the device driver that is received from the OS kernel while the device driver that has failed is being recovered from the failure.

8. The method of claim 6, wherein while the device driver that has failed is being recovered from the failure, further comprising the step of employing the shadow driver to handle a request intended for the device driver that is received from the kernel, by dropping the request.

9. The method of claim 6, further comprising the steps of:
    (a) employing the shadow driver to handle a request intended for the device driver that is received from the OS kernel while the device driver that has failed is being recovered from the failure, by queuing the request; and
    (b) after the device driver has been recovered, forwarding the request to the device driver.

10. The method of claim 6, further comprising the step of employing the shadow driver to handle a request intended for the device driver that is received from the OS kernel while the device driver that has failed is being recovered from the failure, by answering the request based upon the state of the device driver that is stored in memory.

11. The method of claim 4, further comprising the step of operating the shadow driver in a passive mode while the device driver is extensible, and switching the shadow driver to an active mode when the failure of the device driver is detected.

12. The method of claim 4, further comprising the step of isolating the device driver from the OS kernel, so that failures of the device driver are trapped, and an integrity of memory accessed by the OS kernel is protected from failures of the device driver.

13. The method of claim 4, wherein the step of monitoring communications between the device driver and the OS kernel comprises the steps of tapping communications channels; and copying predefined types of data from the communications to track the state of the device driver over time.

14. A computer readable memory medium storing machine instructions for carrying out the steps of claim 4.

15. A system that is able to recover from a failure of a device driver that is executed on the system, comprising:
    (a) a memory in which machine instructions are stored, the machine instructions being used to implement an operating system (OS) kernel, a device driver, and a shadow driver; and
    (b) a processor coupled in communication with the memory, the processor executing the machine instructions to implement a plurality of functions, including:
        (i) running the OS kernel, the device driver, and the shadow driver, by executing the machine instructions provided for each;
        (ii) employing the shadow driver for monitoring communications between the device driver and the OS kernel, to determine a state of the device driver;
        (iii) storing the state of the device driver in the memory;
        (iv) detecting when a failure of the device driver has occurred;
        (v) in response to a failure of the device driver being detected, temporarily interrupting communications between the device driver and the OS kernel, and employing the shadow driver to successively unload the device driver, reload the device driver, and re-initialize the device driver to the state that was stored in the memory; and
        (vi) restoring communications between the device driver that has been re-initialized and the OS kernel, so that the device driver is recovered from the failure.

16. The system of claim 15, wherein the shadow driver is designed for use with a class of device drivers of which the device driver is a member, the shadow driver being usable with any device driver that is a member of the class.

17. The system of claim 15, wherein the shadow driver masks the failure of the device driver from the OS kernel by communicating with the OS kernel after the device driver fails, until the device driver is re-initialized, although the shadow driver does not function as a replacement for the device driver.

18. The system of claim 15, wherein the shadow driver blocks a request intended for the device driver that is received from the OS kernel, while the device driver that has failed is being recovered from the failure.

19. The system of claim 15, wherein while the device driver that has failed is being recovered from the failure, the shadow driver handles a request intended for the device driver that is received from the OS kernel, by dropping the request.

20. The system of claim 15, wherein while the device driver that has failed is being recovered from the failure, the shadow driver handles a request intended for the device driver that is received from the OS kernel, by queuing the request, and after the device driver is recovered, forwards the request to the device driver.

21. The system of claim 15, wherein while the device driver that has failed is being recovered from the failure, the shadow driver handles a request intended for the device driver that is received from the OS kernel, by answering the request based upon the state of the device driver that is stored in the memory.

22. The system of claim 15, wherein the shadow driver is operated in a passive mode while the device driver is extensible and is switched to an active mode when the failure of the device driver is detected.

23. The system of claim 15, wherein the machine instructions executed by the processor isolate the device driver from the OS kernel, so that failures of the device driver are trapped, and an integrity of the memory accessed by the OS kernel is protected from failures of the device driver.

24. The system of claim 15, wherein the shadow driver taps communications channels between the device driver and the OS kernel and copies predefined types of data passing over the communication channel, to track the state of the device driver over time.

25. A method for using a shadow process to reduce any adverse effects to applications and an extensible system that might be caused by a failure of a component, comprising the steps of:
 (a) monitoring communications between the component and the extensible system to identify data conveyed from the extensible system that are directed to the component and are related to a state of the component;
 (b) storing the data related to the state of component, for restoring the state of the component, if the component is restarted after failing;
 (c) determining when the component has failed;
 (d) in response to the component failing, interrupting communications between the component and the extensible system and diverting the communications to the shadow process so that the shadow process can impersonate the component that failed without providing the functionality of said component; and
 (e) stopping and re-initializing the component in a manner that is hidden from the extensible system and from any applications that depend on the component, so that the component is restarted and enabled to again communicate with the extensible system, the steps of stopping and re-initializing the component and failure of the component being hidden from the extensible system and any applications using the component because the component that failed is impersonated until the component is restarted and enabled.

26. The method of claim 25, wherein the component includes an interface to a hardware device, so that while the component is failed and being restarted, the hardware device is unavailable to the extensible system or to any applications.

27. The method of claim 25, further comprising the step of using the data related to the state of the component that was stored for restoring the state of the component before restarting the component, so that the failure of the component will not be apparent to the extensible system or to any applications using the component.

* * * * *